Sept. 3, 1968  E. P. BULLARD III, ET AL  3,400,313
POINT TO POINT MOTOR POSITIONING CONTROL FOR A MACHINE TOOL
INCLUDING TOOL OFFSET COMPENSATION AT EACH POINT
Filed Oct. 22, 1964  3 Sheets-Sheet 1
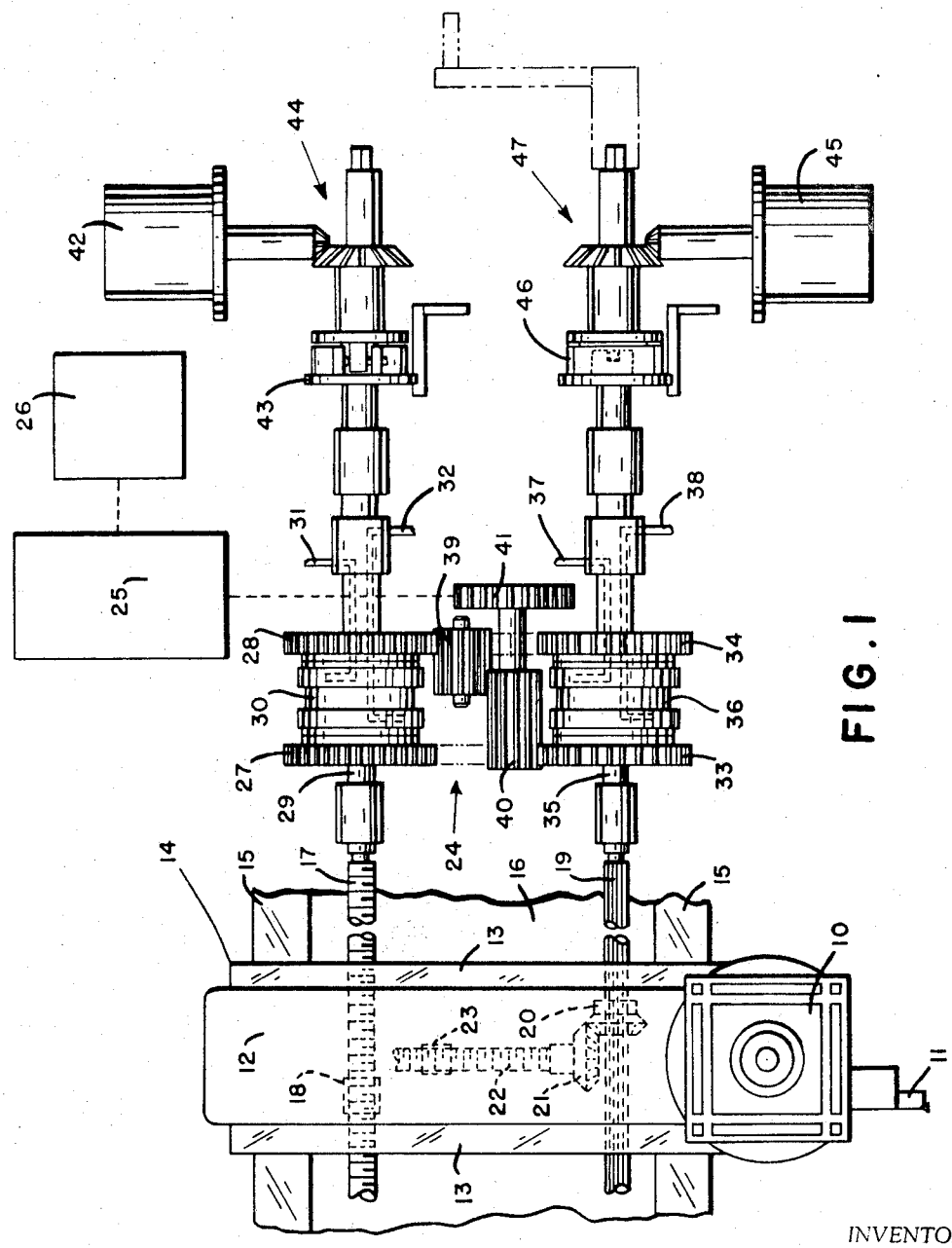
FIG.1
INVENTORS.
EDWARD P. BULLARD III
EDWARD P. BULLARD IV
BY
ATTORNEY

INVENTORS.
EDWARD P. BULLARD III
EDWARD P. BULLARD IV
BY
ATTORNEY.

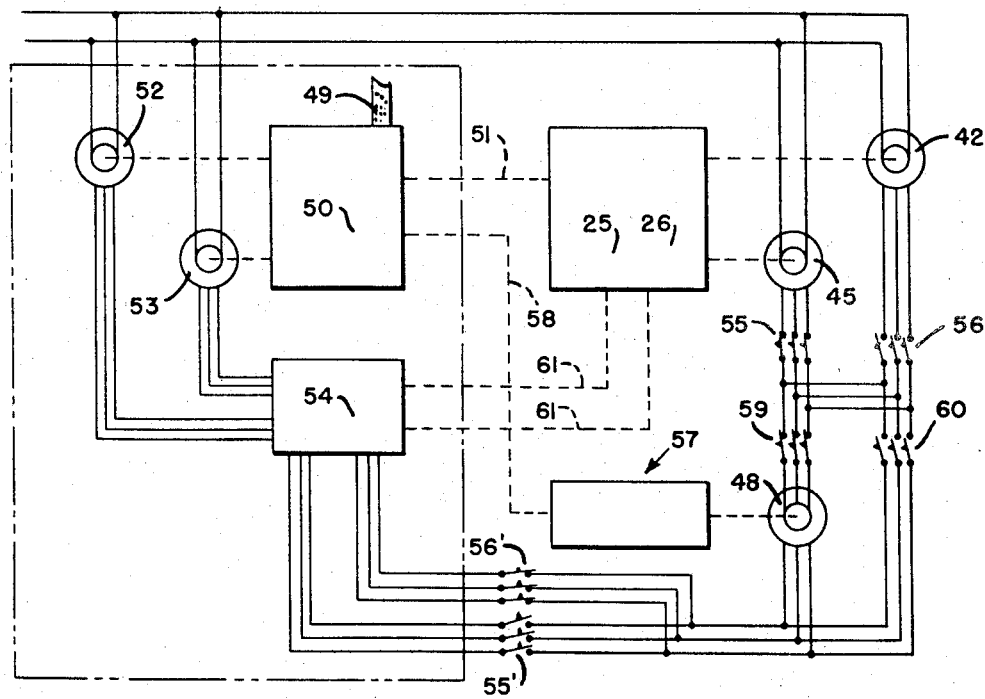
FIG. 3
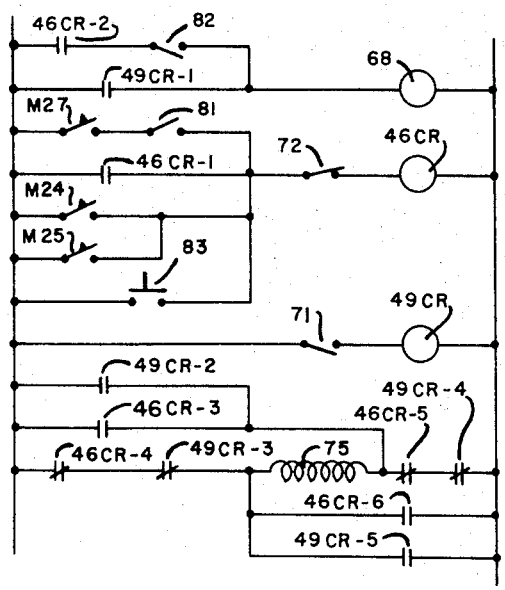
FIG. 4
INVENTORS.
EDWARD P. BULLARD III
EDWARD P. BULLARD IV
BY
ATTORNEY.

United States Patent Office 3,400,313
Patented Sept. 3, 1968

3,400,313
POINT TO POINT MOTOR POSITIONING CONTROL FOR A MACHINE TOOL INCLUDING TOOL OFF-SET COMPENSATION AT EACH POINT
Edward P. Bullard III and Edward P. Bullard IV, Fairfield, Conn., assignors to The Bullard Company, Bridgeport, Conn., a corporation of Connecticut
Filed Oct. 22, 1964, Ser. No. 405,801
6 Claims. (Cl. 318—18)

ABSTRACT OF THE DISCLOSURE

An offset device for a program control providing point-to-point positioning of a movable member, the device having manually adjustable screws mounted on an indexable disk so that the screws are successively positioned at an operative station with each of the screws corresponding to a point on the programmed path of movement of the member. Each screw may variably position a rack connected to a differential generator, the output signal of which is determined by the position of the rack, and which signal may modify the output of a connected synchro generator to provide an offset from the position of the movable member called for by the program control. Upon a command from the program control, a torque motor moves the rack out of engagement with the screw positioned at the operative station while the disk is being indexed, and moves and maintains the rack in engagement with the screw which is then positioned at the operative station.

---

This invention relates to machine tools and particularly to intermittent program control for machine tools.

One form of intermittent program control of machine tools is the well known numerical tape control in which successive blocks of tape include data relative to function and distance of travel of a movable element of a machine tool, such as a cutting tool. In the use of such systems, where ultra precise dimensions are required to be held, various factors enter to inhibit the data on the tape from accomplishing the desired precise dimension. In order to overcome this difficulty, so-called "too offset" devices have been employed.

Currently known tool offset devices are relatively costly, and when as many as twenty or thirty are required for a given job, the control becomes excessively expensive.

The principal object of the present invention is to provide a tool offset system for a tape control that will overcome the above as well as other difficulties.

Another object of the invention is to provide such a tool offset system in which a single unit is employed for multiple offset operations.

Still another object of the invention is to provide such a tool offset system in which mechanical means may be utilized in conjunction with servo means to accomplish the desired results.

In one aspect of the invention, a tool support may be mounted for movement along intersecting axes so that a tool held thereby can be moved universally in a plane. The tool support may be moved by rotatable screw and nut means so that the rotation of two shafts in either direction will cause the tool support to move in either direction along the intersecting axes. The shafts may be rotated by feedworks transmission including clutch means and variable speed means for rotating the two shafts in both directions.

In another aspect of the invention, there may be provided for each shaft a transducer which produces a signal responsive to the angular position of the shaft. A numerical tape control unit may be provided having a signal producing transducer means that is rendered effective by data on the tape.

In another aspect of the invention, the tape may include data that determines which shaft is to be rotated and correspondingly which shaft transducer becomes effective. Normally, the output from the selected shaft transducer is fed back to a comparator where it is compared with the output of signal producing means, the input signal of which is derived from the tape. The output signal from the comparator governs the rotation of the shaft to locate the tool in the desired position. When it becomes null or zero, the tool stops its motion. The foregoing is merely a very general statement of the broad principles of operation of the tape control and is not intended as a complete disclosure since such is not part of the present invention.

In still another aspect of the invention, a tool offset device may be provided that is common to both shaft transducers. It may comprise signal modifying means, the output of which is in the form of a signal which can be added to or subtracted from a selected of the signal producing transducer means that is governed by the rotative position of a selected shaft. In this way, the output from the comparator may be a signal that represents the difference between the tape controlled signal and a modified signal produced by the selected shaft position. This output signal from the comparator causes the machine to operate until such comparator output signal is nulled.

In a further aspect of the invention, the tool offset may comprise a disk having a plurality of micrometrically adjustable screws arranged about its periphery. Power means is provided for the disk which, when energized, causes the disk to index between next succeeding micrometer screws.

In a still further aspect of the invention, a signal producing means such as a differential transformer means may be connected to a reciprocable rack that is in alignment with the micrometer screws as they are indexed past a common point. In order to prevent the rack from interfering with the screws as the disk is adjusted, it is caused to move away from the disk prior to indexing said disk, after which the rack is caused to move toward the disk, its motion being interruped by the preset micrometer screw, causing a predetermined output of the differential transformer means.

The above, other objects and novel features of the control system with tool offset will become apparent from the following specification and accompanying drawings which are merely exemplary.

In the drawings:

FIG. 1 is an elevational view of part of a machine tool to which the principles of the invention have been applied;

FIG. 3 is a schematic diagram of control units forming part of the invention;

FIG. 4 is a wiring diagram for the apparatus shown in FIGS. 1 to 3;

Figure 2:
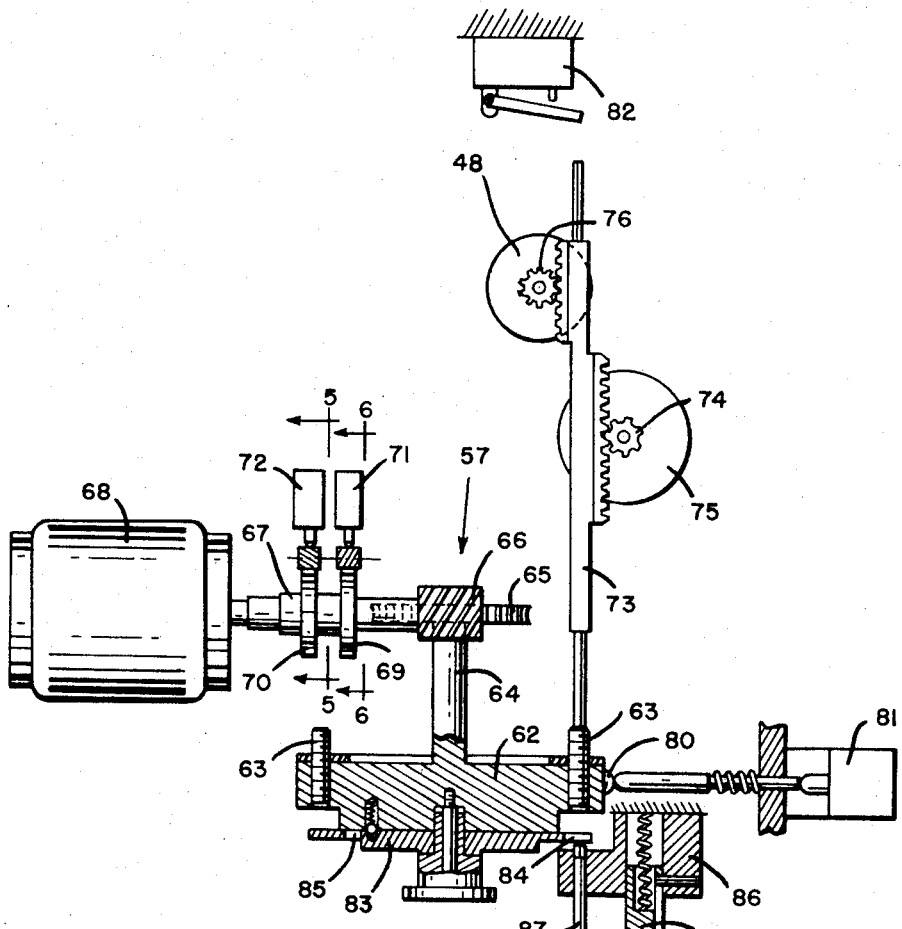
FIG. 2 is a sectional view of a tool offset mechanism to which the principles of the invention have been applied.
Figures 5, 6:
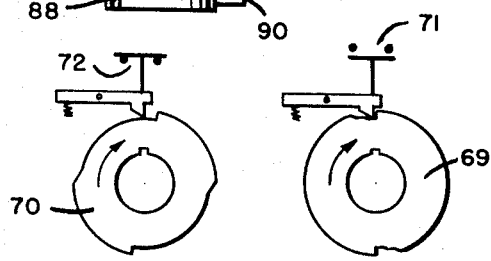
FIG. 5 is a sectional view taken along line 5—5 of FIG. 2.
FIG. 6 is a sectional view taken along line 6—6 of FIG. 2.

Referring to the drawings, and particularly to FIG. 1, the principles of the invention are shown as applied to part of a machine tool including a turret 10 adapted to support one or more tools 11 on each face thereof. The turret 10 is mounted for rotation on the lower end of a tool slide 12 that is mounted for movement in either direction along ways 13 of a saddle 14. Saddle 14 is mounted for movement in either direction along ways 15 of a rail 16. Accordingly, movement of saddle 14 along ways 15 and slide 12 along ways 13 will permit movement of tool 11 universally in a plane parallel with those including ways 13 and 15.

Movement of saddle 14 is effected by the rotation of a screw 17 that threads into a stationary nut 18 fixed to the back of saddle 14. Movement of slide 12 is caused by rotation of a splined shaft 19 that slidingly supports a bevel gear 20 movable along spline 19 as saddle 14 moves. Bevel gear 20 meshes with another bevel gear 21 fixed to a screw 22 that threads into a nut 23 fixed to the slide 12.

Rotation of screw 17 and splined shaft 19 is effected by the rotation of a reversing gearing arrangement 24 that is driven at different rates of rotation by a feedworks 25 that is operated by a control 26. The reversing mechanism 24 may comprise gears 27 and 28 journaled on a shaft 29 that is connected to screw 17. A fluid-operated clutch 30 is shown between gears 27 and 28 having fluid supply lines 31 and 32 which are supplied with pressure fluid by valve means within feedworks 25.

Other gears 33 and 34 are journaled on a shaft 35 that is connected to splined shaft 19, and a fluid-operated clutch 36 is located between gears 33 and 34. Fluid pressure lines 37 and 38 are supplied with pressure fluid through valves controlled in feedworks 25.

Overlapping gears 39 and 40 mesh, respectively, with gears 28, 34; and with gears 27, 33. A drive from feedworks 25 rotates a gear 41 that drives gears 40 and 39, and any of gears 27, 28, 33 and/or 34 depending upon the supply of pressure fluid to lines 31, 32, 37 and/or 38.

Shaft 29 is coupled to a transducer 42 through a manually operable clutch 43 and bevel gears 44. Shaft 35 is coupled to a transducer 45 through a manually operable clutch 46 and bevel gears 47. Transducers 42 and 45 generate the feedback signal representing the rotative positions of shafts 29 and 35 and hence the position of turret 10 in its plane of operation.

Referring to FIG. 3 wherein a simplified schematic illustration is disclosed, the transducers 42 and 45 are shown as synchro generators and the modifier for the offset is shown as a differential synchro generator 48. As the tape 49 passes through the tape reader 50, a function signal 51 is sent to the feedworks and controls 25, 26 to cause the turret 10 to move along a desired path. At the same time, a distance signal is sent to selected of the synchro generators 52, 53, depending upon the path along which turret 10 is to move. The output of the selected synchro generator 52, 53 enters the comparator 54. The position of turret 10 along its selected path of travel produces a signal in the selected synchro generator 42, 45, the output of which passes switches 55, 56 or 55', 56', depending upon which set has been closed by data on tape 49. If the tape data calls for tool offset, the output of the selected transducer or synchro generator 42, 45 acts as the input to the differential generator 48, the rotor setting of which is controlled by tool offset mechanism 57. This latter mechanism 57 also is rendered effective by a signal 58 from the tape 49. The differential generator 48 has the capacity to produce a signal that adds to or subtracts from the output of synchro generators 42, 45. Its capability is, however, limited to maximum movement of turret 10 of about ±0.160 inch. When there is no tape data calling for tool offset, contacts 59 are opened and contacts 60 are closed, shunting out the differential synchro generator 48. Additionally, when data on the tape calls for a tool offset, contacts 60 are opened and contacts 59 are closed.

Either the shunted output of the selected transducer 42, 45, or the output of the selected one modified by the differential generator is fed back to the comparator to be compared with the input signal from the selected transducer 52, 53. The output 61 from the comparator 54 goes to the feedworks and controls 25, 26, causing turret 10 to continue its selected movement until the signal 61 is nulled, whereupon the motion of turret 10 ceases.

Referring to FIG. 2, the offset mechanism 57 may comprise a disk 62 having a plurality of spaced micrometer screws 63 arranged in a circle about disk 62. In the embodiment disclosed, there are forty screws, each having threads such that each revolution of a screw produces 0.0625 inch of linear travel of screw 63, with a head travel of 0.020 inch. The disk 62 is fixed to a shaft 64 supporting a worm gear 65 that meshes with a worm 66 fixed to a shaft 67. Shaft 67 is driven by a motor 68, and control cams 69 and 70 on shaft 67 operate switches 71 and 72 in a manner to index disk 62 from one screw 63 to the next adjacent screw 63.

A rack 73, in line with the screws 63 as they pass therebeneath, meshes with a gear 74 that is driven by a stall torque servo motor 75. The rack 73 also meshes with a gear 76 fixed to the shaft of the differential synchro generator 48. A knob 80 at the zero position of the disk 62 maintains switch 81 open. At every other index position, switch 81 is closed.

With the parts in the condition shown in FIG. 2, and referring to FIG. 4, current flows through motor 75 in a direction to move rack 73 downwardly into engagement with the screw 63 at the zero position. When a block of tape 49 contains data to render effective the offset mechanism 57, a switch M24 or M25 will close, depending upon the axis being employed. Closing either switch M24 or M25 energizes 46CR relay which closes contacts 46CR–1; 46CR–2; 46CR–3 and 46CR–6, and opens contacts 46CR–4 and 46CR–5. The closing of contacts 46CR–1 acts as a holding circuit for relay 46CR. The closing of contacts 46CR–3 and 46CR–6 and opening of contacts 46CR–4 and 46CR–5 cause motor 75 to reverse and rack 73 to be raised until it closes switch 82. Since contacts 46CR–2 are closed, motor 68 is energized, starting the rotation of disk 62 and cams 69 and 70. Motor 75 remains energized, holding rack 73 raised, closing switch 82. When cam 69 has rotated 17°, switch 71 closes, energizing relay 49CR which closes contacts 49CR–1, 49CR–2 and 49CR–5. It opens contacts 49CR–3 and 49CR–4. However, in the condition prevailing at this point, nothing changes by the closing and opening of the 49CR contacts.

When cam 70 has rotated 90°, it opens switch 72, switch 71 remaining closed. Accordingly, relay 46CR is de-energized; relay 49CR remains energized, and still nothing happens. When cam 70 has rotated 170°, switch 72 closes and still nothing happens. Finally, when cam 69 has rotated 180°, switch 71 opens, de-energizing 49CR relay. This closes contacts 49CR–3 and 49CR–4. Since contacts 46CR–4 and 46CR–5 are closed, motor 75 reverses, driving rack 73 downwardly until it strikes the screw 63 at station No. 1 of disk 62 which has been indexed into alignment by the rotation of motor 68. The gearing 65, 66 is such that 180° rotation of shaft 67 will index disk 62 between two succeeding screws 63.

Upon de-energizing relay CR49, contacts 49CR–1 open, thereby de-energizing motor 68 with the circuit in condition to repeat the above cycle when another block of tape 49 closes switches M24 or M25.

A manually operable switch 83 is provided which, when closed, overrides the automatic feature to effect indexing of disk 62. When it is desired automatically to return disk 62 to its zero position, data on tape 49 will close contact M27 which effects continuous indexing of disk 62 until it reaches its zero position, whereupon knob 80 opens switch 81, de-energizing relay 46CR.

Adjustment of screws 63 is made during initial setup. To this end, a disk 83 is mounted on disk 62. It includes a recess 84 on its periphery which is aligned with the circle about which screws 63 are mounted on disk 62. Disk 83 also includes a window 85 through which a number appears corresponding to the station at which is located a screw 63 in line with recess 84.

A bracket 86 may support a shaft 87 in aligned relation with the recess 84, and shaft 87 is mounted for sliding movement toward and from screw 63. A dial 88 on shaft 87 cooperates with a combined spring detent 89 and index pointer 90. The dial 88 may be calibrated in half-thousandths of an inch movement of turret 10.

With disk 83 set so that the numeral in window 85 corresponds to the screw 63 which is to be adjusted, the pressing of dial 88 toward screw 63 causes its square end to mate with a recess in the end of screw 63 so that the screw can be accurately adjusted.

Although the various features of the improved intermittent program control and tool offset have been shown and described in detail to fully disclose one embodiment of the invention, it will be evident that changes may be made in such details and certain features may be used without others without departing from the principles of the invention.

What is claimed is:

1. In an apparatus comprising a movable member, power means for moving said member, program control means for causing said member moving means to effect the movement of said movable member from point to point along a predetermined path of travel, a signal producing device rendered effective by said program control means, a second signal producing device operable by said movable member, and means for comparing signals from both of said signal producing devices and having an output controlling said member moving means, the improvement comprising, a signal modifying device for modifying the signal of said other signal producing device, a reciprocable member operably connected to said signal modifying device, an indexable member mounting a plurality of manually adjustable elements having locating surfaces adapted to engage an end surface of said reciprocable member as each adjustable element corresponding to a point on the programmed path of travel of said movable member is positioned at an operative station, means for indexing said indexable member to successively position said adjustable elements at said station, and means for maintaining said reciprocable member in engagement with the adjustable element positioned at said station and for moving said reciprocable member out of engagement therewith during each indexing cycle.

2. The apparatus as set forth in claim 1 additionally including means rendered effective by said program control means for operating said indexing means.

3. The apparatus as set forth in claim 1 additionally including means rendered effective by said program control means for shunting said other signal producing device around said signal modifying device.

4. Apparatus comprising a program control for moving a member to a plurality of predetermined programmed positions and offset means connected to said program control for adjustably modifying said predetermined positions, said offset means comprising a rotatably movable disk, a plurality of manually adjustable screw elements threadably mounted in said disk having axes of rotation extending substantially parallel to, and being uniformly spaced along a circle concentric with, the axis of rotation of said disk, means for indexably moving said disk to successively position each of said screw elements at an operative station, a reciprocably movable rack having an end surface normally abutting an end of the screw element positioned at said station, means for moving and maintaining said rack out of engagement with said screw elements as said disk is rotatably indexed, and differential generator means operably connected to said rack.

5. The apparatus as set forth in claim 4 additionally including means rendered effective by said program control for indexing said disk.

6. The apparatus as set forth in claim 5 additionally including calibrated means engageable with the screw element positioned at said operative station for adjustably moving said screw element, and means normally maintaining said calibrated means out of engagement with said screw elements.

References Cited

UNITED STATES PATENTS

| | | |
|---|---|---|
| 2,937,325 | 5/1960 | Garber. |
| 2,950,427 | 8/1960 | Tripp. |
| 2,988,681 | 6/1961 | Bower. |
| 3,149,482 | 9/1964 | Gitlin et al. |
| 3,161,110 | 12/1964 | Fitzner. |
| 3,279,624 | 10/1966 | Devol. |

ORIS L. RADER, *Primary Examiner.*

T. LYNCH, *Assistant Examiner.*